(12) United States Patent
Anderson

(10) Patent No.: US 7,503,695 B2
(45) Date of Patent: Mar. 17, 2009

(54) DEVICE AND METHOD FOR HOLDING OPEN DECOY BAGS

(76) Inventor: Dale A. Anderson, 411 SW. 8th Ave., Grand Rapids, MN (US) 55744

( * ) Notice: Subject to any disclaimer, the term of this patent is extended or adjusted under 35 U.S.C. 154(b) by 639 days.

(21) Appl. No.: 11/288,920

(22) Filed: Nov. 29, 2005

(65) Prior Publication Data

US 2006/0115186 A1    Jun. 1, 2006

Related U.S. Application Data

(60) Provisional application No. 60/632,492, filed on Dec. 1, 2004.

(51) Int. Cl.
*B65D 33/00* (2006.01)
*B65D 33/24* (2006.01)
*B65D 85/00* (2006.01)
*B65D 51/00* (2006.01)
*B65D 90/00* (2006.01)

(52) U.S. Cl. .................. 383/33; 383/43; 206/315.11; 220/287; 220/495.08

(58) Field of Classification Search .............. 383/33, 383/43, 78–81; 206/315.11, 315.9; 220/287, 220/495.08; 43/2, 3, 54.1, 55
See application file for complete search history.

(56) References Cited

U.S. PATENT DOCUMENTS

| | | | | |
|---|---|---|---|---|
| 1,730,260 A | * | 10/1929 | Zuckerman | .................. 383/95 |
| 2,301,106 A | * | 11/1942 | Brown | .......................... 53/463 |
| 3,173,687 A | * | 3/1965 | Hair | ........................... 473/449 |
| 4,482,116 A | | 11/1984 | Vadnais | |
| 4,615,743 A | | 10/1986 | Bylenga | |
| 4,723,803 A | | 2/1988 | Sapp | |
| 4,749,011 A | | 6/1988 | Rylander | |
| 4,874,141 A | | 10/1989 | Schulz | |
| 5,014,943 A | | 5/1991 | Nelson et al. | |
| 5,183,339 A | | 2/1993 | Williams | |
| 5,826,771 A | * | 10/1998 | Peng | ........................... 224/651 |
| 6,044,878 A | * | 4/2000 | Sedeno | ....................... 150/101 |
| 6,302,583 B1 | | 10/2001 | Steimetz | |
| 6,986,433 B2 | * | 1/2006 | Colford et al. | ............... 220/229 |
| 2007/0125676 A1 | * | 6/2007 | Cipra et al. | .................. 206/439 |

* cited by examiner

*Primary Examiner*—Jes F Pascua

(57) ABSTRACT

Decoy bags are easily kept open to allow filling with decoys by using a round rigid collar opening in the top of the bag by inserting said collar opening into the decoy bag and securing said bag to the collar opening with a large cable tie. Onto this collar are fitted several ferrules which form a holding mechanism for bungee cords passing through said ferrules. In a preferred embodiment of the invention, the collar is made of a plastic material selected from acrylonitrile-butadiene-styrene, high impact polystyrene or the like and has an indentation around the side so that the bag can be installed and tied.

6 Claims, 4 Drawing Sheets

DEVICE AND METHOD FOR HOLDING OPEN DECOY BAGS

CROSS REFERENCE TO RELATED APPLICATIONS

This application claims priority from U.S. Provisional Patent Application No. 60/632,492 filed on Dec. 1, 2004 and entitled "Device and Method for Holding Open Decoy Bags," which is incorporated herein by reference in its entirety.

BACKGROUND OF THE INVENTION

The invention relates to a device and method useful to waterfowl hunters for holding decoy bags open so that they may be filled easily. Decoy bags are typically canvas, mesh or other cloth bags used to transport decoys to a hunting site. The decoys are then removed from the bag and setup in the water. After hunting, the waterfowl hunter often in waders or from a small boat must retrieve the decoys. Since the decoy bag is typically left in the water as it is being filled, it is difficult to start to fill the decoy bags since they are awkward to hold open to allow the addition of decoys into a bag that sinks in the water, while decoys are prone to float. Sometimes during filling, decoys in a normal decoy bag tend to float out of a decoy bag while a hunter is trying to get other decoys into the bag. Usually there are ties or cinch strings on the decoy bag to hold the bag closed, but this is extremely problematic because of the difficulty of tying and untying the bag while also holding decoys without dropping anything in the process. Decoy bags are inherently small because of the need to close the front of the decoy bag. Another failing of current decoy bags is the difficulty in handling, because there are straps on most decoy bags that wear out or catch on items and rip.

One approach used to surmount these problems is to include a round rigid opening in the bag making a complete assembly, however the limitation of this is the inability to fit onto other bags, and also its inability to stop decoys from floating out of the bag once they are placed therein.

The instant bag collar is able to provide a device and method for easily holding open decoy bags which is simple in design, small, readily stored, space-saving, fits onto all current decoy bags on the market, inexpensive and is easy to use.

BRIEF SUMMARY OF THE INVENTION

In its broadest aspects the invention comprises a device and method for holding open decoy bags. It comprises a rigid circular collar of substantially non-resilient material formed into a circle and having a diameter of at least 6 inches and having a maximum diameter of 18 inches, with the preferred embodiment being 12 inches. This collar has an indentation encircling the entire collar midway down the exterior of the collar. It also has bungee cords or resilient cords passing through said collar to keep decoys inside the bag from floating outside the bag when the bag is lying on its side on a body of water. The device is adapted to be received inside a decoy bag in the top of the decoy bag Also, the bag can be easily mounted around the collar by manipulating the device and locking the bag onto the collar with a large cable tie mechanism Essentially, the device allows one person to load decoys into a decoy bag holding the bag open, and not allow decoys already in the bag to float away.

BRIEF DESCRIPTION OF THE SEVERAL VIEWS OF THE DRAWING

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
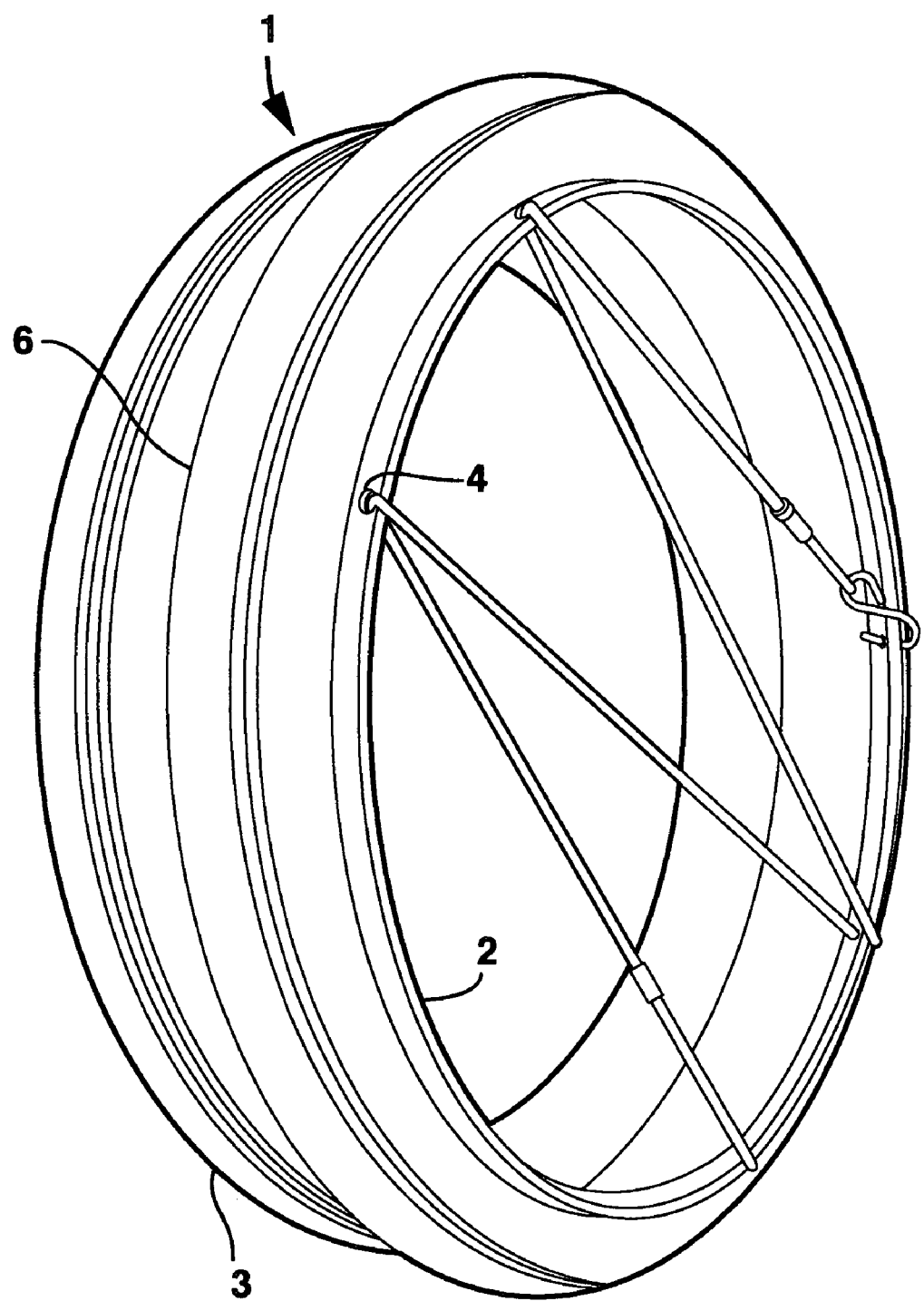
FIG. 1 is a horizontal perspective view of a device having a collar member which contains the device of the invention.
Figure 2:
FIG. 2 is a vertical perspective view of the device with an attached decoy bag being filled with decoys.
Figure 3:
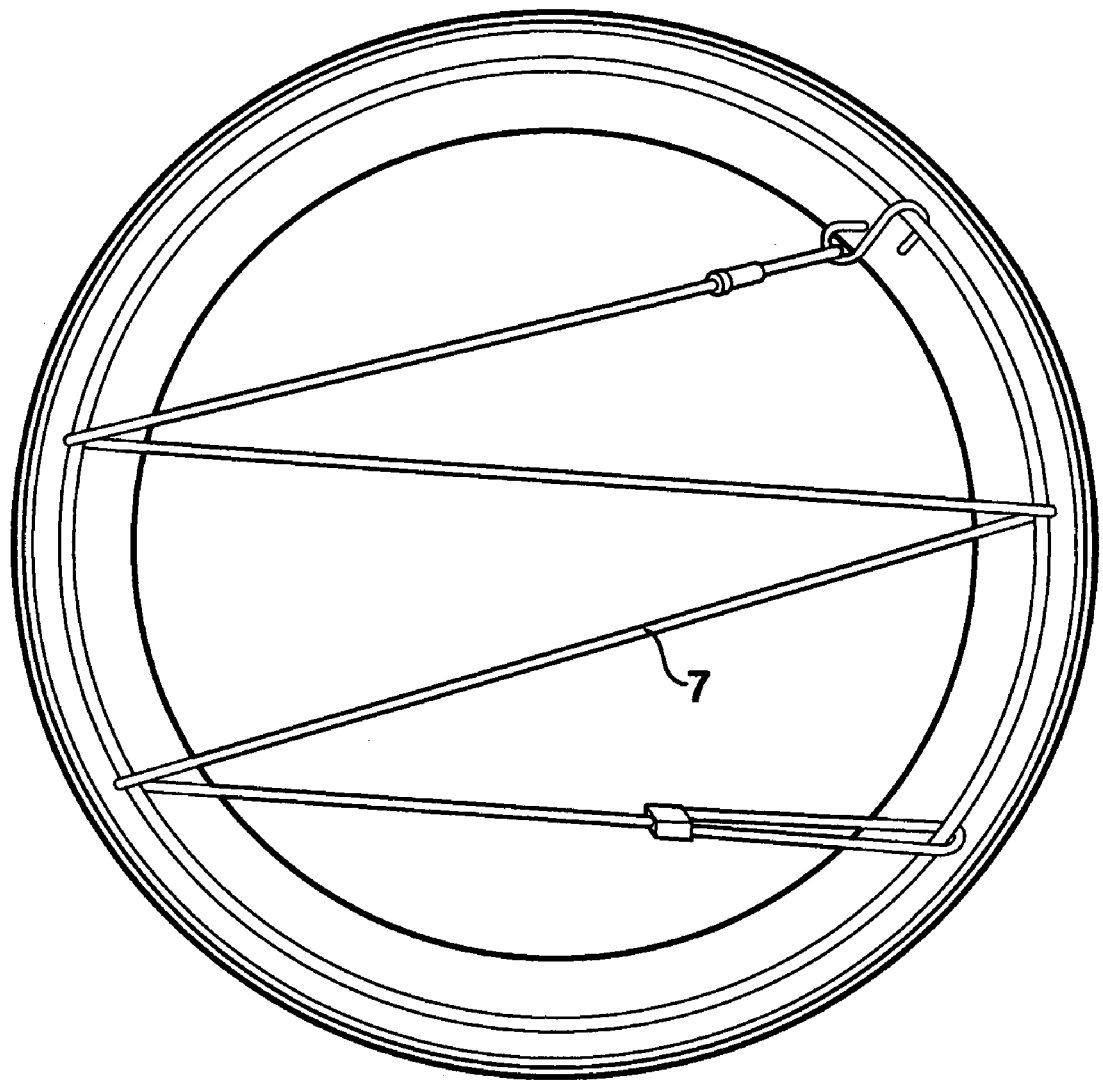
FIG. 3 is a horizontal top plan view of the device showing the resilient cord crisscrossing the collar member.

Specifically, with reference to FIG. 1 and FIG. 3 a device which has a collar member (1) and a resilient cord (7). The collar member (1) has a top end (2), a middle portion (6) and a bottom end (3). Typically the middle portion (6) has a smaller perimeter than the top end (2) or the bottom end (3). Thus around the outside of the collar member (1) middle portion (6) is an indention where a decoy bag fastening means such a cable tie, elastic band, or string secures a decoy bag onto the collar member (1). The fastening means may also be hooks, velcro fasteners, elastic bands or other means that cable do not require the indentation feature as shown in the drawing. The device shown with the decoy bag attached is shown in typical use in FIG. 2.

In the preferred embodiment the collar member (1) is generally cylindrical and has an open annular space running throughout from the top end (2) to the bottom end (3). The size of the annular space opening may be as small as 6 inches or as large as 18 inches in diameter, but preferably should be 12 inches in diameter to accommodate the existing decoy bags out on the market today. The length of the collar is approximately 4", however is can be as narrow as ¾ inch to as wide as 6 inches. The depth of the middle portion indentation can be a small as ⅛ inch, but works best if the indentation is a full 2 inches deep.

FIG. 3 shows the orientation of the resilient cord (7) positioned so that decoys can be placed through the top end (2) of the collar portion (1) into the decoy bag. The elasticity of the resilient cord (7) is selected so that the decoys can be passed through the top end (2) relatively easily, but once in the decoy bag, a decoy falling or floating out of the bag will not pass through the collar portion without some assistance.

Figure 4:
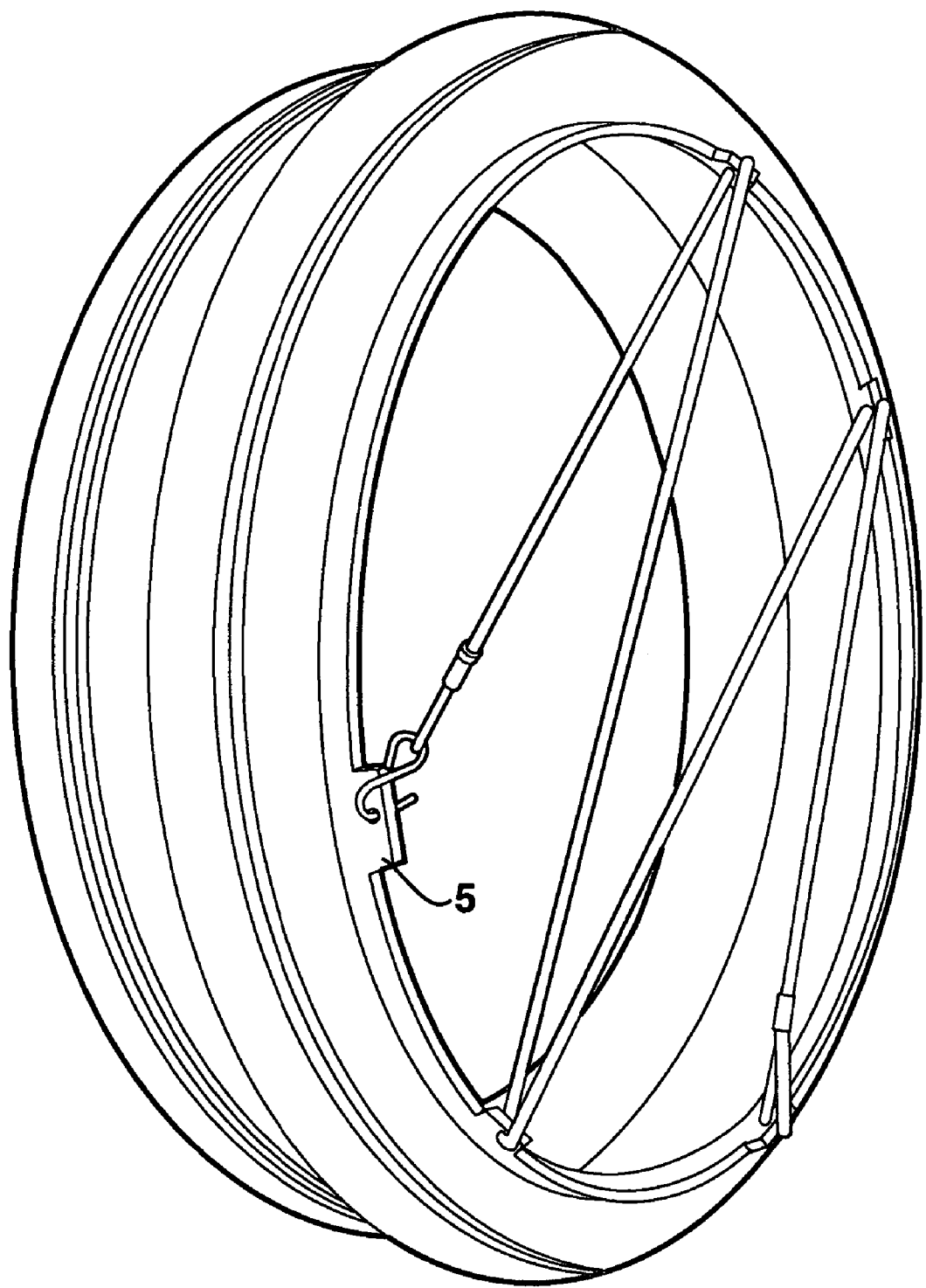
FIG. 4 is a horizontal perspective top views of an alternative embodiment of the collar member with the cord openings located on tabs.

There are two embodiments of a cord fastening means shown to this device, FIG. 1 showing a device where the cord openings (4) are used to secure the resilient cord (7), and FIG. 4 showing a device where there are tabs (5) above the collar for attaching the resilient cord (7).

The collar member (6) should be constructed of a material that is preferably circular, substantially rigid to retain its shape during use aand lighter than water, e.g. can be formed into a complete circle and can float. Typical of such materials are high density polyethylene plastic (HDPE), low density polyethylene (LDPE), polyvinyl chloride (PVC), carbon polyvinyl chloride (CPVC), wood, bamboo and polystyrene plastics. Plastics are preferred. Particularly preferred are hard plastics with less brittle plastics such as acrylonitrile-butadiene-styrene (ABS) plastic) and the like being preferred. For low cost construction, a small section of corregated ABS drainage pipe is often used for the collar member.

I claim:

1. A device for holding open a decoy bag comprising; a collar member surrounding a substantially open annular space, the collar member composed of a substantially rigid material having a top end, a middle portion, and a bottom end, wherein said top end has a plurality of cord openings located around the top end perimeter routing and holding a resilient cord crossing said open annular space and the resilient cord extending inwardly from one edge of said top end at angles such that the cord openings approximately oppose one another, and the collar member having an attachment means for the decoy bag.

2. The device of claim 1 wherein the collar member is formed from plastic, wood or polystyrene.

3. The device of claim 1 wherein the middle portion of said collar member attachment means consists of an indentation formed by having the middle portion perimeter less than the top end perimeter and bottom end perimeter.

4. The device in claim 1 wherein the middle portion of the collar member is attached to a decoy bag.

5. The device in claim 1 wherein the cord openings are located on a plurality of tabs extending from the collar member top end with said tabs having cord openings located in said tabs for routing and holding said resilient cord crossing over said open annular space.

6. A method for loading a decoy bag comprising; securing a device as described in claim 1 to a decoy bag opening with a fastening means, bagging a plurality of decoys by inserting the decoys through the device into the decoy bag, and thereby preventing bagged decoys from escaping from the decoy bag.

* * * * *